US009316723B2

(12) United States Patent
Tayrani et al.

(10) Patent No.: US 9,316,723 B2
(45) Date of Patent: Apr. 19, 2016

(54) DIFFERENTIAL HIGH POWER AMPLIFIER FOR A LOW PROFILE, WIDE BAND TRANSMIT ARRAY

(75) Inventors: Reza Tayrani, Marina Del Ray, CA (US); Walter B. Schulte, Jr., Huntington Beach, CA (US); James A. Carr, Fountain Valley, CA (US); Jar J. Lee, Irvine, CA (US)

(73) Assignee: RAYTHEON COMPANY, Waltham, MA (US)

( * ) Notice: Subject to any disclaimer, the term of this patent is extended or adjusted under 35 U.S.C. 154(b) by 513 days.

(21) Appl. No.: 13/479,792

(22) Filed: May 24, 2012

(65) Prior Publication Data
US 2013/0314288 A1 Nov. 28, 2013

(51) Int. Cl.
*H01Q 1/50* (2006.01)
*H01Q 13/00* (2006.01)
*H01Q 9/16* (2006.01)
*G01S 7/03* (2006.01)
*H01Q 1/44* (2006.01)
*H04B 1/04* (2006.01)

(52) U.S. Cl.
CPC ............. *G01S 7/032* (2013.01); *G01S 7/034* (2013.01); *H01Q 1/44* (2013.01); *H04B 1/0458* (2013.01)

(58) Field of Classification Search
CPC .............................. H04B 1/0458; G01S 7/034
See application file for complete search history.

(56) References Cited

U.S. PATENT DOCUMENTS

| 4,027,253 A | 5/1977 | Chiron et al. ............. 333/1.1 |
| 5,638,033 A | 6/1997 | Walker et al. ............. 333/1.1 |
| 6,721,544 B1 | 4/2004 | Franca-Neto | |
| 6,808,494 B2 * | 10/2004 | Shifrin ..................... 600/437 |
| 6,891,446 B2 | 5/2005 | Tayrani et al. ............ 333/20 |
| 6,949,978 B2 | 9/2005 | Tayrani et al. ............ 330/251 |

(Continued)

FOREIGN PATENT DOCUMENTS

| EP | 1 515 449 | 3/2005 |
| EP | 1 515 449 A1 | 3/2005 |

(Continued)

OTHER PUBLICATIONS

PCT Search Report and Written Opinion of the ISA; dated Dec. 11, 2012; for PCT Pat. App. No. PCT/US2012/050888, 12 pages.
Lee et al.; "Broadband GaN HEMT Push-Pull Microwave Power Amplifier;" IEEE Microwave and Wireless Components Letters, vol. 11, No, 9; Sep. 2001; pp. 367-369.

(Continued)

*Primary Examiner* — Hoang V Nguyen
*Assistant Examiner* — Michael Bouizza
(74) *Attorney, Agent, or Firm* — Daly, Crowley, Mofford and Durkee, LLP

(57) ABSTRACT

An integrated differential high power amplifier-radiator array that overcomes the prior art impedance match issues is described. An impedance matching balun is used to feed a high output impedance, differential HPA, which in turn drives a wide band radiator or array of radiators having a matching input impedance to provide a highly efficient, compact transmit system. In one exemplary embodiment, the HPA may be a high impedance Class-B HPA configured as a push-pull cascode amplifier. A high impedance isolator or circulator may be used between the HPA and the radiator. One of ordinary skill in the art will readily appreciate that a receive implementation, using a properly matched low noise amplifier in place of the HPA, is also possible. Similarly, with the addition of a slotline circulator, transceiver operation is also attainable with the addition of an impedance matched receive chain.

18 Claims, 5 Drawing Sheets

(56) References Cited

U.S. PATENT DOCUMENTS

| | | | |
|---|---|---|---|
| 7,315,288 | B2 | 1/2008 | Livingston et al. ............ 343/770 |
| 7,511,658 | B1 | 3/2009 | Grebennikov et al. |
| 2001/0043128 | A1* | 11/2001 | Lo ................................ 343/859 |
| 2005/0075083 | A1 | 4/2005 | Cairo |
| 2005/0090287 | A1 | 4/2005 | Rofougaran |
| 2007/0222697 | A1* | 9/2007 | Caimi et al. .................. 343/861 |
| 2009/0256631 | A1* | 10/2009 | Bockelman et al. ........... 330/149 |
| 2010/0216413 | A1* | 8/2010 | Khannur ......................... 455/78 |
| 2012/0049973 | A1* | 3/2012 | Smith et al. .................... 333/103 |

FOREIGN PATENT DOCUMENTS

| | | |
|---|---|---|
| JP | 2005-160026 | 6/2005 |
| TW | 1287317 | 9/2007 |
| TW | 1287317 B | 9/2007 |
| TW | 201136023 A1 | 10/2011 |
| TW | 201136026 | 10/2011 |

OTHER PUBLICATIONS

Lin et al.; "Development of a Wideband Highly Efficient GaN VMCD VHF/UHF Power Amplifier;" Progress in Electromagnetics Research C; vol. 19; Jan. 2011; pp. 135-147.

Livingston et al.; "A Wide Band Low Profile Dual-pol "Thumbtack" Array;" IEEE International Symposium on Phased Array Systems and Technology (ARRAY); Oct. 2010; pp. 477-483.

Paidi et al.; Simulations of High Linearity and High Efficiency of Class B Power Amplifiers in GaN HEMT Technology; IEEE Lester Eastman Conference, High Performance Devices; Aug. 2002; pp. 101-107.

Xie et al.; "High-Linearity Class B Power Amplifiers in GaN HEMT Technology;" IEEE Microwave and Wireless Components Letters, vol. 13; No. 7; Jul. 2003; pp. 284-286.

PCT International Preliminary Report on Patentability and Written Opinion of the ISA dated Dec. 4, 2014; for PCT Pat. App. No. PCT/US2012/050888; 8 pages.

European Patent Application No. 12762432.8 Publication Notice dated Mar. 11, 2015, 1 page.

Taiwan Patent Application No. 101132366 Office Action dated Mar. 9, 2015 including English translation, 20 pages.

Taiwan Patent Application No. 101132366 Search Report date of completion Jan. 16, 2015, including English translation, 3 pages.

Response filed Aug. 10, 2015; for European Pat. App. No. 12762432. 8; 13 pages.

Taiwanese Response filed May 11, 2015; for Taiwanese Pat.App.No. 101132366; 7 pages.

Taiwanese Response filed May 11, 2015 (translation with claims); for Taiwanese Pat.App.No. 101132366; 8 pages.

Email from Taiwanese International Patent & Law Office dated May 11, 2015; for Taiwanese Pat.App.No. 101132366; 6 pages.

Email from Taiwan International Patent & Law Office dated Jul. 23, 2015; for Taiwan Pat. App. No. 101132366; 2 pages.

Taiwan Office Action and Search Report of the Taiwan IPO dated Jul. 3, 2015; for Taiwan Pat. App. No. 10113366; 9 pages.

Taiwan Office Action and Search Report (English translation) of the Taiwan IPO dated Jul. 3, 2015; for Taiwan Pat. App. No. 101132366; 10 pages.

Response dated Oct. 5, 2015 to Taiwanese Office Action dated Jul. 3, 2015; For Taiwanese Pat. App. No. 101132366; 11 pages.

Taiwanese Office Action and Search Report with English translation dated Dec. 2, 2015; For Taiwanese Pat. App. No. 101132366; 16 pages.

Letter from Muhann Patent and Law Firm dated Dec. 16, 2015; For Korean Pat. App. No. 10-2014-7035843; 1 page.

Response dated Dec. 10, 2015 to Korean Office Action; for Korean Pat. App. No. 10-2014-7035843; 21 pages.

Application No. 2015-513990 Office Action dated Nov. 27, 2015 with English translation 9 pages.

Application No. 101132366 Office Action with English Translation dated Dec. 2, 2015, 12 pages.

Application No. 101132366 Taiwan IPO Search Report dated Oct. 22, 2015, 4 pages.

* cited by examiner

DIFFERENTIAL HIGH POWER AMPLIFIER FOR A LOW PROFILE, WIDE BAND TRANSMIT ARRAY

BACKGROUND

A typical conventional integrated antenna system (such as that used in a phased array antenna) may include many radiating elements. Referring to FIG. 1, each radiating element 110 may comprise of the following components: radiator 110 (including a matching taper 113 and balun 116), an optional filter 120, circulator 130, and high power amplifier (HPA) 140. (For simplicity of illustration, the feed network is omitted.) All these components are designed separately, yet to a common interface impedance (for example, 50 ohm), including the radiator input balun 116. The radiator output impedance, however, is necessarily different: free space wave impedance is typically about 377 ohms. The typical constraint on the system impedance (i.e., to 50 ohms) coupled with the need to radiate into free space at 377 ohms drastically degrades transmitter performance and increase the weight and volume of the system. Transmitters designed based on the aforementioned approach suffer from low efficiency, high prime power requirement, large volume, and weight.

In an active electronically scanned array (AESA), in particular, where the need for high integration and small form factor is especially acute, the impedance match problem can have serious consequence. For example, lower power efficiency leads to undesirably high thermal loads and increased prime power requirements. High internal impedance mismatch can also limit bandwidth, in accordance with Fano's theorem, and the use of longer radiators. Impedance mismatch also can result in lowered reverse isolation, which causes amplifier load pull and reduced stability. Finally, the high distortion resulting from internal reflections degrades pulse-on-pulse and pulse-on-continuous wave (CW) performance of the radar.

One conventional approach in commercial wireless radio frequency (RF) applications is to use integrated active antennas that attempt to better match the internal impedances, thereby enhancing efficiency. Such antennas typically employ a longer radiator impedance taper to reduce impedance mismatch, but this reduces the antenna bandwidth and increases the physical size of the antenna. However, such integrated active antennas have not, to date, proved to be viable solutions for microwave phased array applications.

SUMMARY

To overcome the above-stated impedance match issues with existing phased array systems, an integrated differential high power amplifier-radiator array is described. Here, an impedance matching balun is used to feed a high output impedance, differential HPA. The differential outputs of the HPA in turn drive a reduced height wide band radiator, or array of radiators, having a matching input impedance to provide a highly efficient, compact transmit system. The taper and balun of the prior art radiator are eliminated, thus lowering weight and cost. Better impedance matching with fewer components increases bandwidth and efficiency, thus further lowering size, weight, power, and cost.

In some embodiments, an impedance matched (i.e., high impedance) isolator or circulator may be used between the HPA and the radiator, to further improve RF performance. In a further embodiment, the high impedance isolator may be a slotline isolator.

The concepts, systems, and techniques herein described are not limited to a transmit system only; one of ordinary skill in the art will readily appreciate that a receive implementation, using a properly matched low noise amplifier in place of the HPA, is also possible. Similarly, with the addition of a slotline circulator, transceiver operation is also attainable with the addition of an impedance matched receive chain.

In one exemplary embodiment, the HPA may be a high impedance Class-B HPA configured as a push-pull cascode amplifier, with a differential load impedance of 100 to 200 Ohms, connected to an impedance-matched slotline circulator and thence to a reduced height radiator array, characterized by a high impedance aperture matching to free space wave impedance (377 ohms) without a long flare (taper) as in a conventional design.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Embodiments of the present system are directed to techniques for improving the impedance matching, isolation, loss, distortion, and ultimate system efficiency of an array of active radiating antenna elements. The topology of the integrated antenna element is radically changed from a single-ended (unbalanced) chain to a differential (balanced) scheme in order to address these issues and allow a reduction in overall antenna size, weight, and power for both commercial and military applications.

In exemplary embodiments of the present concepts, systems, and techniques, a balun is used to feed a high output impedance, differential HPA. The differential outputs of the HPA in turn drive an array of radiating elements having a high input impedance to provide a highly efficient, compact transmit system. The taper and balun of the prior art radiator are thus eliminated, thus further lowering weight and cost.

Figure 1:
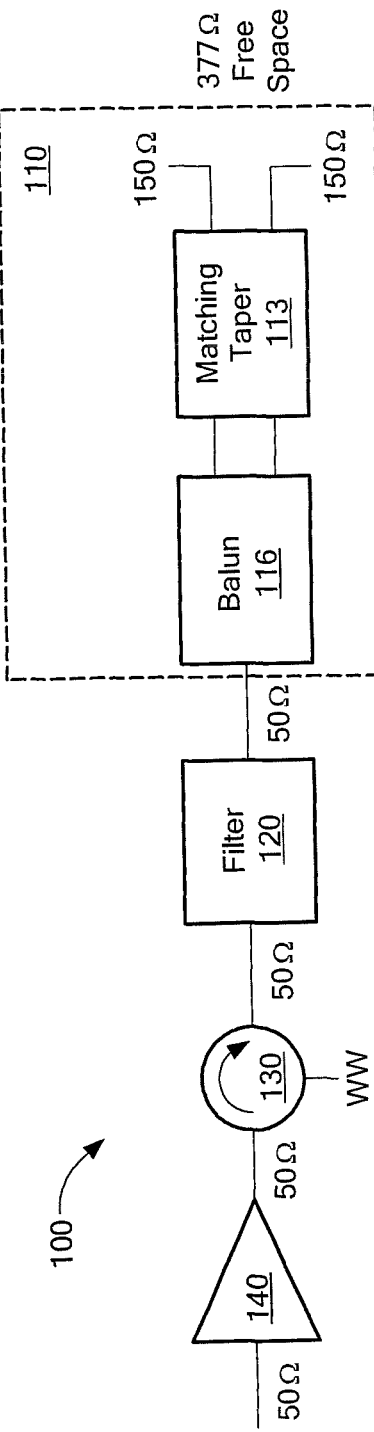
FIG. 1 is a diagram of a prior art radiating element typically used in an active array.
Figure 2:
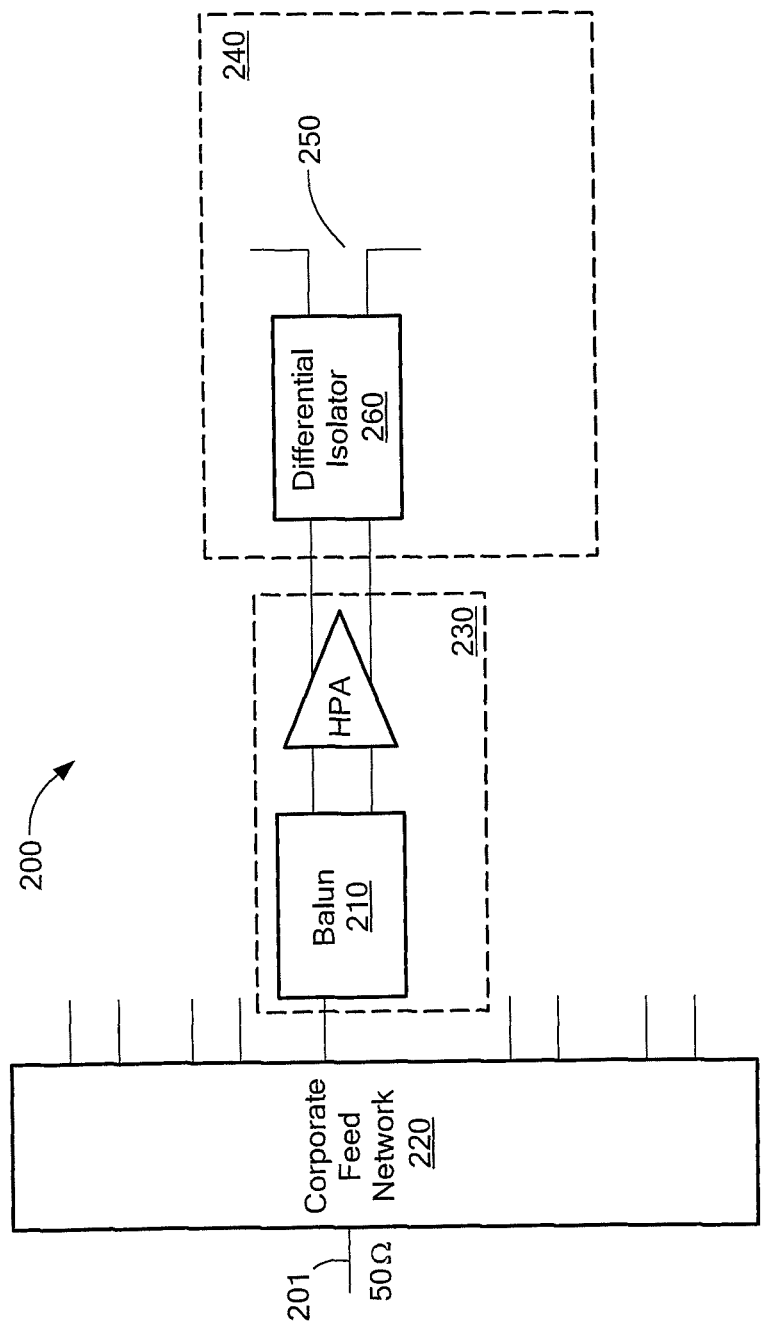
FIG. 2 is a diagram of an integrated differential HPA radiating element, according to one embodiment of the present invention.

FIG. 2 illustrates an integrated antenna system constructed according to one exemplary embodiment of the concepts, systems, and techniques disclosed herein. The integrated antenna system 200 comprises an unbalanced feed network, 220 such as (but not limited to) a corporate feed network as used in an active electronically scanned array (AESA). The feed network 220 distributes the unbalanced signals to a plurality of high power amplifier modules 230, only one of which is illustrated in FIG. 2 for clarity. High power amplifier module 230 comprises an input device 210 adapted to transform the unbalanced input signal 201 (typically 50 ohms) into a balanced differential signal. The balanced differential signal then drives a balanced push-pull amplifier with a balanced, high output impedance. The differential output of the amplifier then drives a differential isolator (circulator) 260, which in turn drives a differential radiator 250. Differential isolator (circulator) 260 and differential radiator 250 together form a radiating element 240.

In some embodiments, input device 210 may be a conventional balun or a slot line balun similar to that described in commonly-owned U.S. Pat. Nos. 6,891,446 and 6,949,978, both of which are incorporated herein by reference in their entireties. Alternatively, input device 210 may be replaced by an amplifier that is designed to have an unbalanced input port and a balanced output port. The design of such a differential amplifier is well within the skill of one of ordinary skill in the art. In a further alternate embodiment, input device 210 may be a conventional 180 degree hybrid. Accordingly, the form and/or implementation of the impedance and balanced-to-unbalanced signal transformation are not limited to a single device or class of devices.

Each HPA 230 is, in one exemplary embodiment, a differentially-driven Class B push-pull amplifier with two gallium nitride (GaN) high electron mobility transistors (HEMT) in cascode. Such an amplifier configuration is more efficient than a typical Class A or Class AB amplifier. Furthermore, class B push-pull operation cancels out most of the even order ($2^{nd}$, $4^{th}$, $6^{th}$, etc.) harmonics, resulting in less intermodulation distortion between time-coincident signals and less interference with nearby systems.

Although a GaN HEMT-based HPA is described, those skilled in the art will realize that HPA technologies other than a GaN HEMT can be used. Transistor amplifier technologies, such as but not limited to HEMTs in other semiconductor materials, bipolar junction transistors, or even vacuum tubes are well known in the art and equally adaptable to the required Class B push-pull cascode configuration. Accordingly, the concepts, systems, and techniques described herein are not limited to any particular type of HPA technologies.

The differential, high impedance output of each HPA 230 is then connected, through conventional means, to impedance-matched differentially-driven radiating element 240. Radiating element 240 may be, in general, any differentially-driven antenna element, such as but not limited to a dipole, spiral, patch, horn, plate, and planar waveguide antennas and the like. Preferably, radiating element 240 is a low profile wide band array using connected dipoles, long slots, or dual-polarization "thumbtack" radiating elements. FIG. 2 illustrates a dipole antenna 250 for ease of presentation; such a depiction is not intended to be limiting. Radiating element 240 then radiates the amplified signal into free space.

Figure 4:
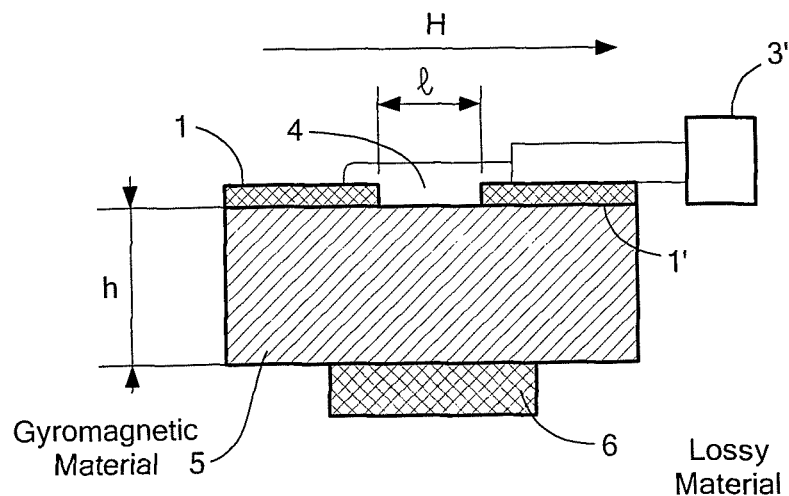
FIG. 4 is a schematic section view of a typical slotline circulator adapted for use according to one embodiment of the present invention.

Typically, an isolator or "non-reciprocal transmission line" is supplied between HPA 230 and antenna elements 250. Such an isolator, as is well known in the art, is employed to provide a measure of protection from undesirable signal reflection. In some exemplary embodiments of the present concepts, systems, and techniques, an impedance matched (i.e., high impedance) isolator may be used to further improve RF performance. In a further embodiment, the high impedance isolator may be a slotline isolator 260. Slot line isolator 260, discussed in further detail below with respect to FIG. 4, is a broadband, low insertion loss device specifically fabricated for the frequency band of interest.

Figure 3:
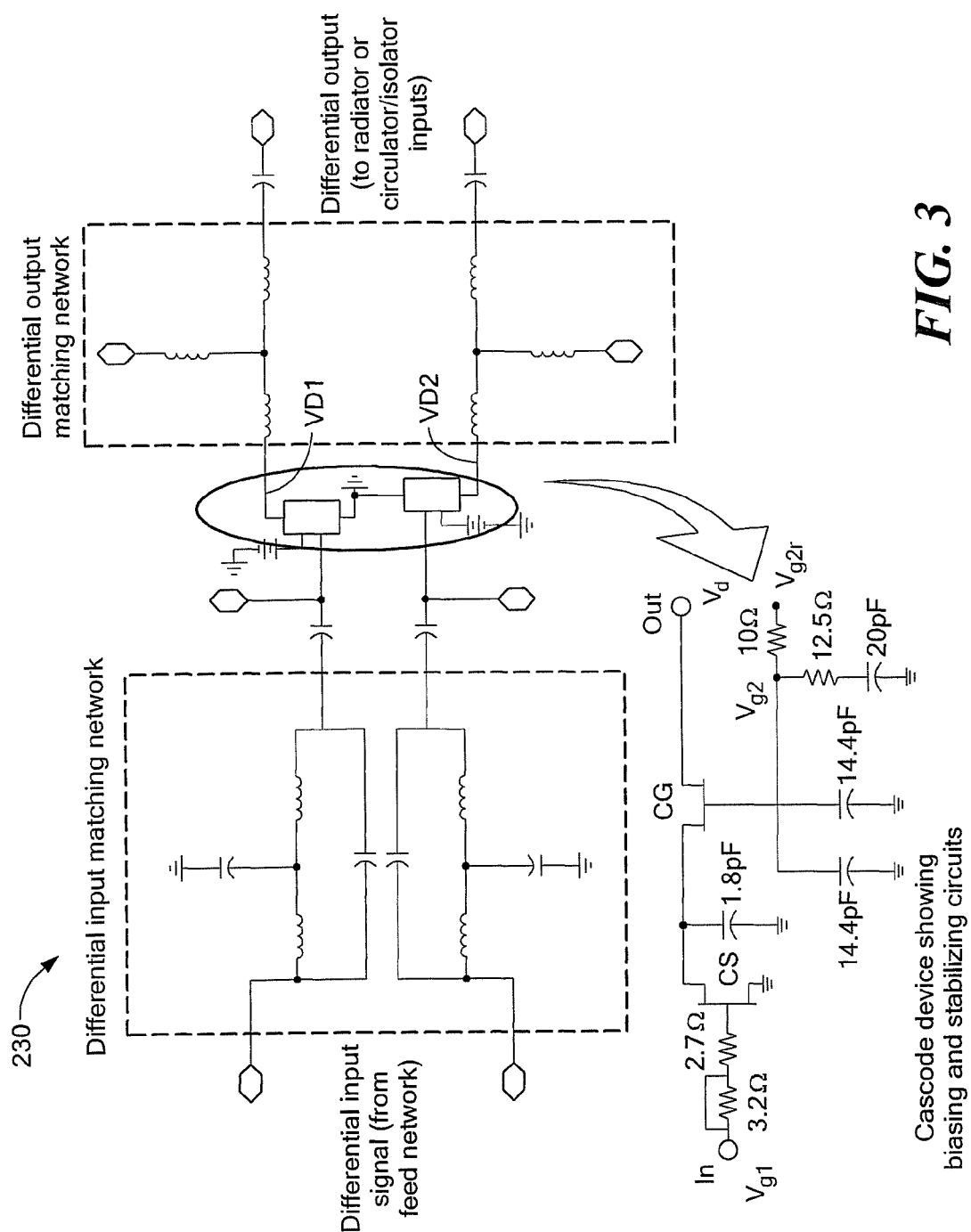
FIG. 3 is a high-level schematic block diagram of a cascode device as used in one embodiment of the present invention.

FIG. 3 illustrates a schematic equivalent circuit of the cascade GaN HEMT used in one exemplary embodiment of Class B push-pull HPA 230. The field effect transistors CS and CG configuration represents the HEMT devices. The cascode configuration is realized by physically connecting a common source (CS) device to a common gate (CG) device. As shown, bias and stabilization components are used to ensure stability performance. Simultaneously achieving high efficiency, high power and low distortion over a wide frequency bandwidth is a major challenge in HPA design. The proposed differential Class B HPA shown in FIG. 3 offers high power, improved efficiency, and low distortion over multi octaves frequency bands.

Although the HPA's input and output matching networks are shown in lumped components, these could be replaced with any suitable lumped and/or distributed elements, the design of which is well within the skill of one of ordinary skill in this art. Furthermore, the proposed matching network topologies shown in FIG. 3 are not unique. Their choice is influenced mainly by the GaN HEMT device periphery and its nonlinear circuit model. Many other circuit topologies could be used as is known to those skilled in this art.

Although biasing and stabilizing components having various values are shown, those skilled in the art will realize that components other than those shown can be used to accommodate a wide range of transistor devices, operating parameters, and system design goals. All such variations are well within the skill of one of ordinary skill in the art. Accordingly, the concepts, systems, and techniques described herein are not limited to any particular biasing components or arrangement thereof.

FIG. 4 depicts a slotline isolator according to one embodiment of the present invention. This isolator is similar to that described in U.S. Pat. No. 4,027,253, issued on May 31, 1977, the disclosure of which are incorporated herein by reference in its entirety. In this depiction, a transverse section of an isolator according is shown. With proper selection of slotline geometry, gyromagnetic material, and magnetic bias of the gyromagnetic material, a field displacement effect is set up in the slotline 4 whereby a forward wave travels on the metalized slot side of the substrate 5 while a reverse wave travels on the opposing side. The reverse wave is attenuated by a microwave absorbing material 6 selected for the desired frequency band. Thus, a non-reciprocal transmission line is formed with low loss in the forward direction and high loss (isolation) in the reverse direction. The slot line is formed in the gap between two thin metallic strips 1, 1' directly deposited on a substrate 5 of low loss gyromagnetic material. Disposed against the face of the substrate opposite slot line is a plate 6 made of any suitable microwave absorbing material known in the art.

Figure 5:
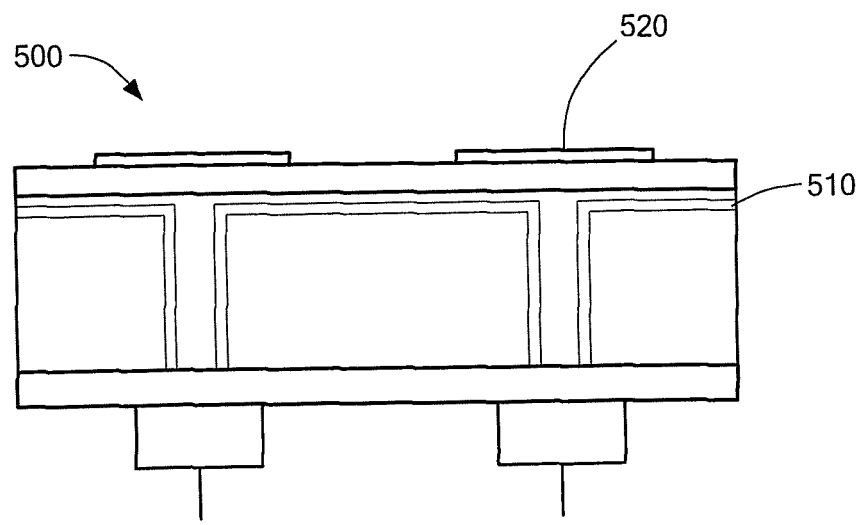
FIG. 5 is a schematic section view of a thumbtack dual-polarization, co-phase array of antenna elements, according to one embodiment of the present invention.

FIG. 5 is a conceptual illustration of a prior art "thumbtack" style, dual-polarized, co-phase array 500 with high (~300 to 377 ohms) impedance constructed in accordance with S. Livingston, J. J. Lee, "A Wide Band Low Profile Dual-pol "Thumbtack" Array", Proceedings of 2010 IEEE International Symposium on Phased Array Systems and Technology, 2010, pp. 477-483, (hereinafter, Ref [1]) incorporated herein by reference in its entirety. As described in Ref

[1], the coincident phase dual-polarized "thumbtack" element is a product of interleaving two sets of wide band "long slot" elements (such as those described in U.S. Pat. No. 7,315,288, incorporated herein by reference in its entirety). It is a low profile, 4:1 band, low cost, dual-polarized array designed for low band applications. The feed network exciting the long slots is an array of connected dipoles 510. The antenna can be seen as an array of crossed long slots, or in a duality sense a 2-D array of connected dipoles top loaded with square patches 520. The array is characterized by a high impedance (~300 ohm) aperture, which matches to free space's wave impedance (377 ohm) directly without a long flared transition as in a Vivaldi notch. The low profile and planar structure produces very low cross-polarization, typically 30 dB down at boresight, and 15 dB down out to 45° off axis along the diagonal cut.

Figure 6:
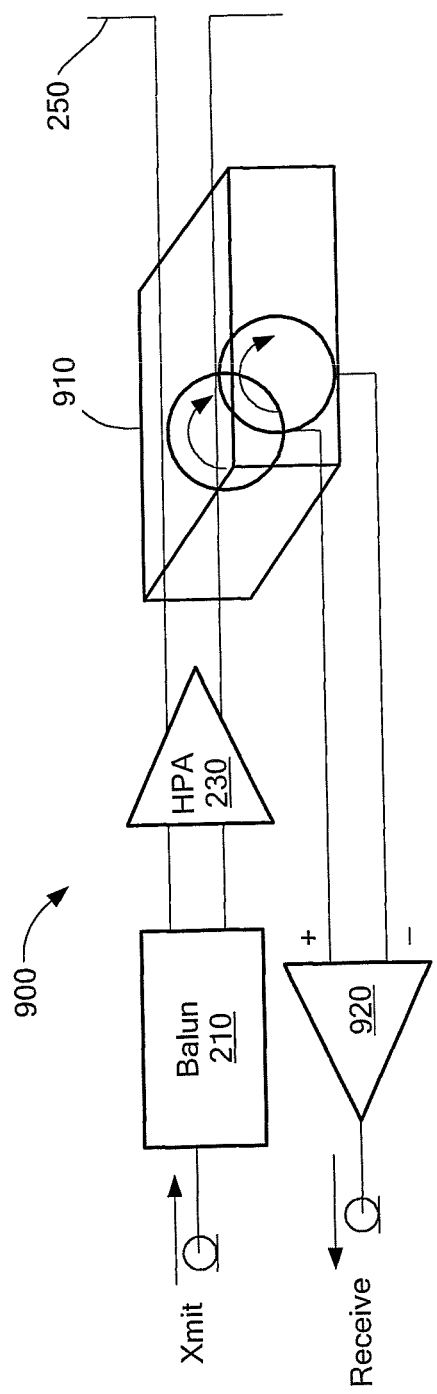
FIG. 6 is a high-level schematic block diagram of a transceiver constructed according to one embodiment of the present invention.

The concepts, systems, and techniques herein described are not limited to a transmit system only; one of ordinary skill in the art will readily appreciate that that a receive implementation, using a properly matched low noise amplifier in place of the HPA, is also possible. Similarly, with the addition of a slotline circulator, transceiver operation is also attainable with the addition of an impedance matched receive chain. FIG. 6 depicts a high level block diagram of one such embodiment, wherein the integrated antenna system 900 now includes a differential slotline circulator 910 in place of an isolator and a differential low-noise amplifier (LNA) 920 for amplifying the relatively low power received signals.

Figure 7:
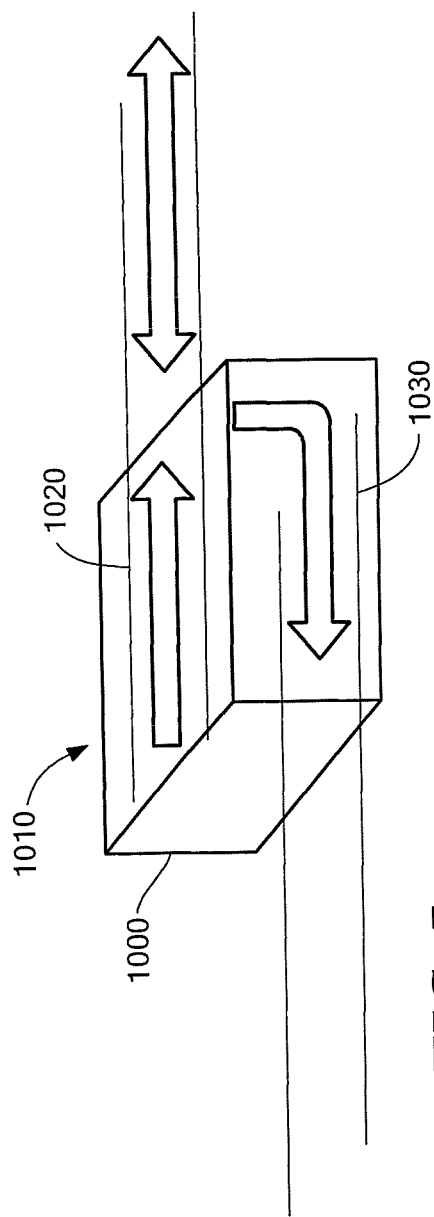
FIG. 7 is an illustration of the operation of transceiver slotline isolator concept of operations, constructed according to one embodiment of the present invention.

The theory of operation of differential slot line circulator 910 is shown in FIG. 7. Here, a magnetic field bias 1010 sets up a field displacement effect in the slotline whereby a forward wave travels on the metalized slot side 1020 of the substrate 1000 while a reverse wave travels on the opposing side 1030. The reverse wave is attenuated by a microwave absorbing material selected for the desired frequency band. Thus, a non-reciprocal transmission line is formed with low loss in the forward direction and high loss (isolation) in the reverse direction. The slot line is formed in the gap between two thin metallic strips directly deposited on a substrate of low loss gyromagnetic material. Disposed against the face of the substrate opposite slot line is a plate made of any suitable microwave absorbing material known in the art.

While particular embodiments of the present invention have been shown and described, it will be apparent to those skilled in the art that various changes and modifications in form and details may be made therein without departing from the spirit and scope of the invention as defined by the following claims. Accordingly, the appended claims encompass within their scope all such changes and modifications.

We claim:

1. An integrated antenna system, comprising:
   an input device configured to convert a supplied unbalanced signal into a balanced differential output signal;
   a high power amplifier (HPA) operably coupled to said differential output signal, said HPA configured as a Gallium Nitride (GaN) cascode push-pull Class B amplifier having a balanced, high impedance output, wherein the HPA includes an output impedance in a range between 100 and 200 ohms; and
   an impedance-matched differentially-driven radiator (IMDDR) comprising a differential antenna element and at least one of a differential slotline isolator and a differential slotline circulator,
   wherein a differential input port of said IMDDR is operatively coupled to said balanced high impedance output of said HPA, the differential input port of said IMDDR coupled to an input of the at least one of a differential slotline isolator and a differential slotline circulator, and a differential output of the at least one of a differential slotline isolator and a differential slotline circulator is radiated into free space by the differential antenna element.

2. The apparatus of claim 1, wherein said input device comprises a balun.

3. The apparatus of claim 1, wherein said input device comprises a slotline balun.

4. The apparatus of claim 1, wherein said input device comprises a differential amplifier.

5. The apparatus of claim 1, wherein said input device comprises a 180 degree hybrid.

6. The apparatus of claim 1, wherein said HPA comprises a GaN high electron mobility transistor (HEMT).

7. The apparatus of claim 1, wherein said HPA comprises a bipolar junction transistor (BJT) assembly.

8. The apparatus of claim 1, wherein said differential antenna element comprises an array of differentially-driven radiating elements.

9. The apparatus of claim 1, wherein said differential antenna element comprises one of the group consisting of a dipole element, a horn element, a spiral element, a patch element, and a reflector element.

10. The apparatus of claim 1, wherein said differential antenna element comprises an array of radiating elements each selected from the group consisting of a dipole element, a horn element, a spiral element, a patch element, and a reflector element.

11. The apparatus of claim 1, wherein said differential antenna element comprises an active electronically scanned array (AESA).

12. An integrated antenna system configured as a transceiver, comprising:
    an input device configured to convert a supplied unbalanced signal into a balanced differential output signal;
    a high power amplifier (HPA) operably coupled to said differential output signal, said HPA configured as a cascode push-pull Class B amplifier and having a balanced high impedance output;
    a differential low-noise amplifier (LNA); and
    an impedance-matched differentially-driven radiator (IMDDR) comprising a differential antenna element having a differential port and a differential slotline circulator having a plurality of differential ports,
    wherein one of said plurality of differential ports of said slotline circulator is operably connected to said differential port of said antenna element and receiving signals from free space thereby, another of said plurality of differential ports of said slotline circulator operably connected to said LNA; and another of said plurality of differential ports of said slotline circulator operably connected to said differential output of said HPA, wherein said LNA is configured to amplify said received signals and wherein said HPA is configured to amplify signals for radiation into free space by said IMDDR.

13. The apparatus of claim 12, wherein said input device comprises a balun.

14. The apparatus of claim 12, wherein said input device comprises a differential amplifier.

15. The apparatus of claim 12, wherein said HPA comprises a Gallium Nitride (GaN) high electron mobility transistor (HEMT).

16. The apparatus of claim 12, wherein said differential antenna element comprises an array of differentially-driven radiating elements.

17. The apparatus of claim 12, wherein said differential antenna element comprises an active electronically scanned array (AESA).

18. The apparatus of claim 12, wherein the HPA includes an output impedance in a range between 100 and 200 ohms.

* * * * *